P. H. SCHWARTZ.
SPRING SUPPORT FOR VEHICLE BODIES AND SEATS.
APPLICATION FILED JULY 22, 1909.

946,881. Patented Jan. 18, 1910.

Witnesses:
Christopher J. Jensen
Henry F. Schwartz

Inventor:
Paul H. Schwartz

UNITED STATES PATENT OFFICE.

PAUL H. SCHWARTZ, OF BIG SANDY, MONTANA.

SPRING-SUPPORT FOR VEHICLE BODIES AND SEATS.

946,881.     Specification of Letters Patent.     Patented Jan. 18, 1910.

Application filed July 22, 1909. Serial No. 509,068.

To all whom it may concern:

Be it known that I, PAUL H. SCHWARTZ, a citizen of the United States, residing at Big Sandy, in the county of Chouteau and State of Montana, have invented certain new and useful Improvements in Spring-Supports for Vehicle Bodies and Seats, of which the following is a specification.

This invention relates to spring supports for vehicle bodies or seats.

The present invention has for its object the provision of a novel spring support for vehicle bodies or seats which will be provided with means whereby the vehicle body or seat which is supported thereby will be spring-floated, capable of adjustment to different positions, and of regulation of tension, to suit the load, and to this end the invention consists in the provision of substantially horizontal coil springs interposed between the vehicle running gear and the body or seat which is supported, together with novel adjusting devices, whereby the tension of the springs and the position of the body or seat can be changed as found desirable, as will appear more fully hereinafter.

Figure 3:
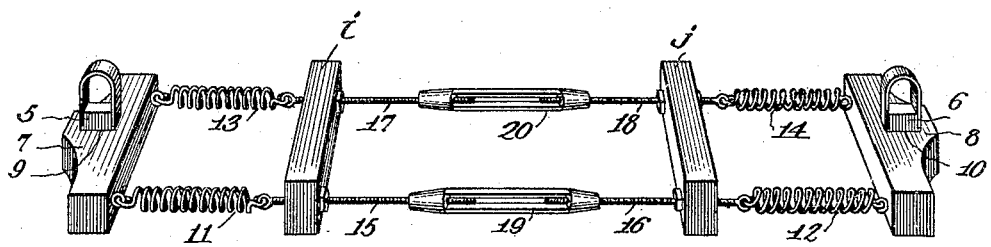
Figure 2:
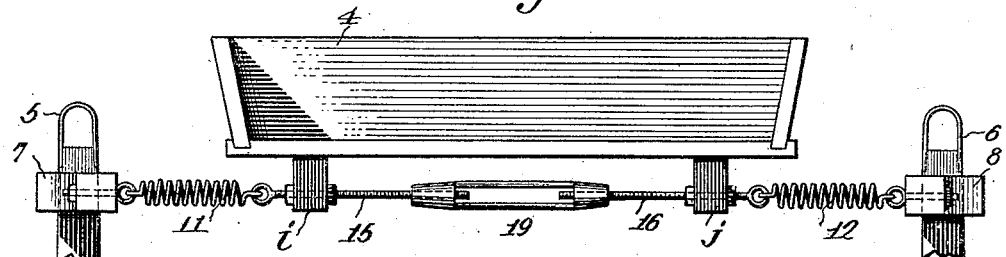
Figure 1:
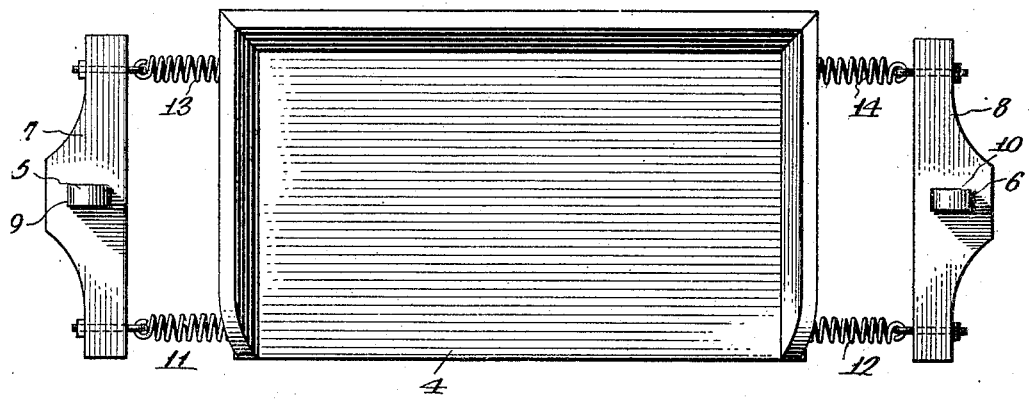

In the accompanying drawings:—Figure 1 is a plan view showing the invention as applied to a vehicle seat; Fig. 2, a front elevation thereof; and Fig. 3, a perspective view of the spring support, the seat being removed.

The present invention is adapted for application to any vehicle body or seat, but is illustrated as used in connection with a wagon seat.

At 5 and 6 there are represented the upper ends of standards rising from the wagon and passing through mortises 10 in cross-trees 7 and 8.

The seat 4 is supported on cross-bars $i$, $j$. The cross-bars $i$ and $j$ are connected by eye-bolts 15, 16, 17 and 18 which pass freely through openings in said cross-bars, said cross-bars being secured in position by nuts on said eye-bolts and located on opposite sides of the cross-bars. The inner ends of the eye-bolts are connected, respectively, by turn-buckles 19 and 20, whereby any desired adjustment may be obtained.

Passing through the respective cross-trees 7 and 8 are eye-bolts held by nuts, to which and to the eyes of the eye-bolts 15, 16, 17 and 18 are connected the coil springs 11, 12, 13 and 14. The springs 11 and 12 and eye-bolts 15 and 16 are substantially parallel to the springs 13, 14 and the eye-bolts 17 and 18, and the whole spring supporting structure is disposed horizontally, the seat 4 being spring-floated, as it were, so that it may yield in all directions.

The provision of the adjustable eye-bolts 15, 16, 17 and 18, which can be adjusted to any desired extent through the cross-bars $i$, $j$, in connection with the turn-buckles 19 and 20, enables any desired tension to be brought upon the springs 11, 12, 13 and 14 according to requirements of the load, and provision is also thus made for shifting of the cross-bars $i$, $j$, and the seat which is carried thereby, to any desired position.

Having thus described my invention, what I claim as new and desire to secure by Letters Patent, is:—

1. In a spring support for vehicle seats, the combination with a seat, of sustaining members, coil springs connected to said sustaining members and located on opposite sides of the seat, and adjustable means extending from one set of coil springs to the other set of coil springs and connected to the seat, whereby said seat is spring-floated, braced, and the springs are rendered capable of tensioning to any desired extent.

2. In a spring support for vehicle seats, the combination with a seat, of sustaining members, coil springs connected to said sustaining members and located on opposite sides of the seat, screws connected to the respective springs and adjustably connected to the seat, and turn-buckles affording adjustable means between the said screws, whereby the seat is spring-floated, braced, rendered adjustable, and the tension of the springs made capable of regulation.

PAUL H. SCHWARTZ.

Witnesses:
  ALEXANDER S. CHRISTIE,
  HENRY F. SCHWARTZ, Jr.